United States Patent
Soethje

[15] 3,706,519
[45] Dec. 19, 1972

[54] DEVICE FOR PROVIDING HOLLOW PLASTIC BODIES, AND ESPECIALLY PLASTIC PIPES, WITH A REINFORCED SLEEVE-END PROVIDED WITH A BEAD

[72] Inventor: Guenter Soethje, Rehau/Bayern, Germany

[73] Assignee: Rehau Plastiks of Canada Limited, Montreal, Quebec, Canada

[22] Filed: Sept. 29, 1970

[21] Appl. No.: 76,464

[30] Foreign Application Priority Data
Oct. 6, 1969    Germany..................P 19 50 270.6

[52] U.S. Cl. ..................425/389, 425/392, 264/94, 264/322
[51] Int. Cl. ..............................................B29c 17/07
[58] Field of Search.......264/94, 296, 322; 18/19 TE, 18/DIG. 14, DIG. 19, DIG. 41, DIG. 44; 425/389, 392

[56] References Cited

UNITED STATES PATENTS

| 729,099 | 5/1903 | Smith | 18/19 TE UX |
| 3,205,535 | 9/1965 | Niessner et al. | 18/19 TE X |
| 2,458,854 | 1/1949 | Hull et al. | 18/19 TE UX |
| 3,425,093 | 2/1969 | Ansette | 18/19 TE |
| 3,432,887 | 3/1969 | Poux et al. | 18/19 TE |

FOREIGN PATENTS OR APPLICATIONS

| 1,124,930 | 8/1968 | Great Britain | 18/19 TE |

*Primary Examiner*—Robert L. Spicer, Jr.
*Attorney*—Christen & Sabol

[57] ABSTRACT

Apparatus for providing beaded sleeve ends on plastic pipes comprising an outer mould part defining a grooved outer mould surface and an inner mould part defining an inner mould surface. The inner mould part includes an expanding mandrel and an upsetting ring joined by a flexible ring for forming a bead in the grooved surface. The upsetting ring has a shoulder for engaging the end surface of the pipe and moving the pipe end axially inwardly to provide additional plastic material during the bead forming operation.

2 Claims, 2 Drawing Figures

PATENTED DEC 19 1972  3,706,519

INVENTOR
GUENTER SOETHJE
BY Fetherstonhaugh & Co.
ATTORNEYS.

DEVICE FOR PROVIDING HOLLOW PLASTIC BODIES, AND ESPECIALLY PLASTIC PIPES, WITH A REINFORCED SLEEVE-END PROVIDED WITH A BEAD

BACKGROUND OF THE INVENTION

The invention relates to a method and apparatus for providing hollow plastic bodies, and especially plastic pipes, with a beaded sleeve-end.

Such apparatus consists essentially of a compression mould made up out of a cylindrical hollow body consisting of two jaws and forming the outer part of the mould, and a cylindrical hollow body located therein and forming the inner part of the mould, together with a bead forming means. In order to make it possible to remove a beaded sleeve-end from the mould, the casing of the internal cylindrical hollow body may consist of a plurality of segments, opposing segments being capable of moving relatively to each other for the purpose of removing the work-piece from the mould.

SUMMARY OF THE INVENTION

It is an object of the present invention to simplify a device of this kind and also to provide the advantage of producing a formed pipe-end, the end-face of which is flat and free of folds and therefore requires no finishing.

This invention provides apparatus for forming a beaded sleeve-end on hollow plastic bodies, and especially on plastic pipes, including a pair of jaws forming a cylindrical hollow outer mould part having an internal surface corresponding to the external surface of a beaded sleeve-end to be produced, and an internal mould part located in the said hollow outer mould part. The said internal mould part consists of an expanding mandrel and an upsetting ring capable of moving axially in relation to the said mandrel, the said mandrel and upsetting ring being connected by flexible bead-pressing ring which expands radially outwards when the expanding mandrel and upsetting ring approach each other axially, the said bead-pressing ring lying opposite a bead receiving groove arranged in the internal surface of the outer mould part. The upsetting ring has a radially outwardly extending shoulder for engaging the end surface of a pipe in the apparatus and the shoulder assumes the function of an upsetting device so that upon relative axial movement of the mandrel and ring the pipe end is deformed axially to provide an excess of material at the bead-forming location. Axial displacement of the upsetting ring towards the expanding mandrel permits the bead-pressing ring, initially lying flush with the expanding mandrel, to arch radially outwards and thus to force the excess of material which is at the same time being produced at the adjacent part of the pipe wall into the internal ring in the surrounding cylindrical hollow body, thus forming the bead. The additional plastic material produced by the axial movement of the upsetting ring makes it possible to produce a bead which has a wall thickness as great as that of the unformed pipe, in contrast to known methods which produce beads of reduced wall thickness and correspondingly lower strength. When the pipe-end is to be removed from the mould, the upsetting ring need only be returned to its starting position, after which the outer cylindrical hollow body, formed by the two jaws, is opened. The beaded sleeve-end may then be withdrawn from the mandrel without difficulty. It is advisable to have the moulding space thicker then the thickness of the remainder of the pipes so that the formed pipe-end is at least as strong as the remainder of the pipe by preventing the wall thickness from being reduced by the forming of the sleeve-end and the bead, which would result in a reduction in mechanical strength.

BRIEF DESCRIPTION OF THE DRAWING

The invention is explained in greater detail with the aid of the drawings which show, by way of example.

DESCRIPTION OF THE PREFERRED EMBODIMENT

Figure 1:
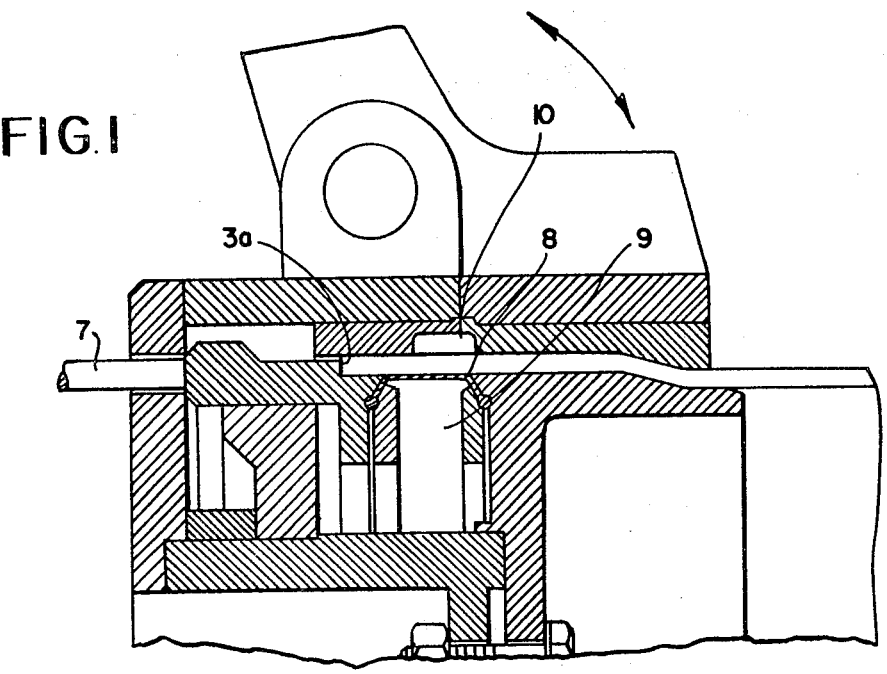
FIG. 1 is an axial section of one embodiment of the invention.
Figure 2:
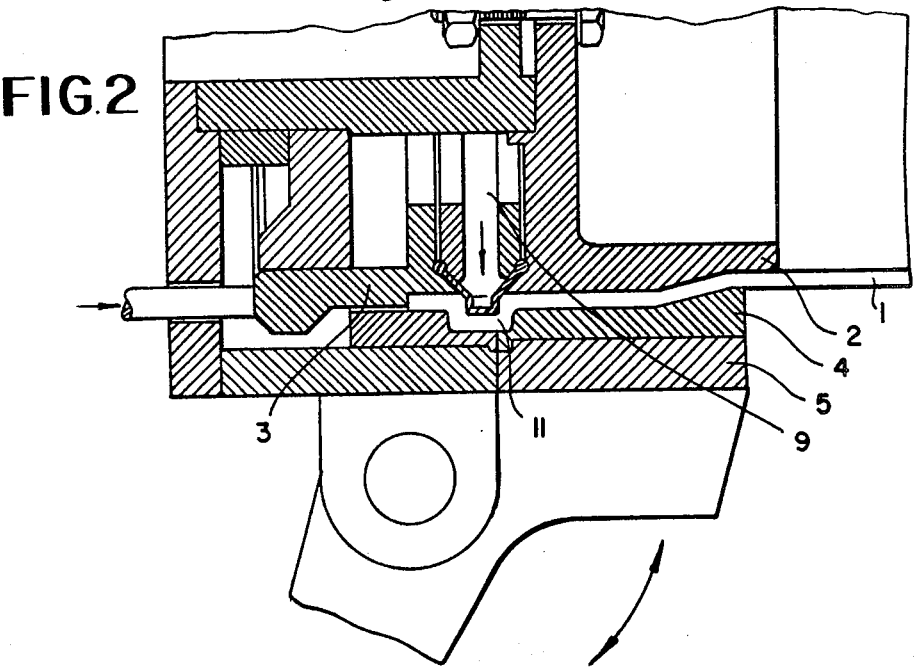
FIG. 2 discloses the embodiment of the apparatus in a second position.

A pipe-end 1, which is to be formed, and which is brought to a deformable condition by heating, is located in a mould consisting essentially of a heated cylindrical expanding mandrel 2 and an upsetting ring 3, with a radially extending shoulder 3a on the one hand, and a cylindrical hollow body surrounding the said expanding mandrel 2, on the other hand. The said cylindrical hollow body is made up out of pairs of jaws consisting of concentrically arranged inner jaws 4 and outer jaws 5. Inner jaws 4 define, as a cylindrical surface with an internal groove 10 formed therein, an outer mould surface for the beaded sleeve end. Upsetting ring 3 is moved axially towards expanding mandrel 2 by means of a hydraulic cylinder, not shown in the drawing, whose piston acts on rods 7. Expanding mandrel 2 and upsetting ring 3, which are arranged coaxially one behind the other, are connected together by means of a flexible bead-pressing ring 8 and define an inner mould surface. The latter, which in its starting position lies flush with expanding mandrel 2, is forced radially outwardly by hydraulic fluid supplied under pressure to the space 9 through conduit means (not shown), when upsetting ring 3 is moved towards expanding mandrel 2.

The forming operation with the apparatus described above proceeds as follows: a pipe having a heated pipe-end 1 is clamped in a holder, not shown; the device, with the jaws open, is then pushed into pipe-end 1 until its end edge lies against the shoulder 3a on upsetting ring 3, the pipe-end being expanded by heated expanding mandrel 2. The pairs of jaws, consisting of inner jaws 4 and outer jaws 5 and constituting the external mould for the sleeve-end, is now closed. The jaws now surround and grip the pipe-end under pressure. The upsetting ring 3 is then moved, by means of the hydraulic cylinder not shown, axially towards expanding mandrel 2. The shoulder 3a pushes the material of the extreme end of the pipe axially to the right as shown in the drawings, and at the same time, under the action of the hydraulic fluid delivered under pressure to the space 9, flexible bead-pressing ring 8 expands radially outwards, thus pressing the adjacent part of pipe-end 1 into annular groove 10 and forming bead 11 in pipe-end 1. It is important to note that, despite the substantial deformation of the pipe wall required to form the bead 11, the thickness of the material in the region of the finished bead is no less than the wall thickness of the pipe, and can, if desired be arranged to be greater. This is achieved by the axial deformation of the pipe-end by the shoulder 3a of the upsetting ring, this deformation being effective to provide sufficient material at the bead-forming location to prevent any thinning out of the pipe wall during formation of the bead.

The bead-pressing ring 8 can be of any suitable flexible material, for example, a polyurethane elastomer.

It is not necessary for the ring 8 to include any special stiffening means to produce the desired bead profile, since it its heated condition, the pipe-end will readily conform to the shape of the groove 10 in the jaws 4.

The drawing shows two phases of the forming operation, the pair of jaws formed by inner jaws 4 and outer jaws 5 being closed in each case. In the upper half of the drawing, upsetting ring 3 is shown in its starting position. In this position, flexible bead-pressing ring 8 lies flush with expanding mandrel 2. The lower half of the drawing shows the end of the forming operation. The upsetting ring has been pushed axially towards expanding mandrel 2 and bead-pressing ring 8 has been arched radially outwards by the action of the pressure medium in space 9. Bead 11 is formed. At the conclusion of the forming operation outlined, upsetting ring 3 is pushed back axially to its starting position, hydraulic fluid is evacuated from the space 9, and bead-pressing ring 8 also returns to its starting position, as shown in the top half of the drawing. The pairs of jaws consisting of inner jaws 4 and outer jaws 5 are now opened, whereupon the device may be withdrawn from the pipe-end 1 which has been expanded into a sleeve and provided with a bead 11.

What I claim as my invention is:

1. Apparatus for forming an internal peripheral recess adjacent an end of a hollow tubular thermoplastic body comprising: a pair of separable co-operating jaw members defining a cylindrical hollow body having an inside surface providing a circumferential radial groove; a moulding means positioned co-axially within said hollow body and comprising: a mandrel adapted to engage a portion of said thermoplastic body against said jaw members, and an end portion axially spaced from said mandrel and defining an upsetting ring adapted to engage a radial end surface of said body, said mandrel and said end portion being relatively movable axially and being connected respectively to opposite ends of a short flexible tubular forming ring positioned radially inwards of said groove and defining a pressure chamber between said mandrel and said end portion; means for producing relative axial movement between said mandrel and said upsetting ring; and means operable upon relative axial movement of said mandrel and said upsetting ring towards each other simultaneously to develop fluid pressure within said chamber to extend said forming ring radially outwards thereby moulding said recess in the end of the tubular thermoplastic body by deforming outwards into the groove in the jaw members the material of the thermoplastic body displaced by said upsetting ring.

2. Apparatus according to claim 1 wherein said mandrel comprises first and second cylindrical portions of different diameters spaced at opposite ends of an intermediate frusto-conical portion, said first cylindrical portion being of larger diameter and being closer to said upsetting ring, a cylindrical surface on said upsetting ring of a diameter equal to that of the first cylindrical portion of the mandrel and providing with the latter and the tubular forming ring a substantially continuous cylindrical surface when the upsetting ring and the mandrel are moved axially apart.

* * * * *